United States Patent
Drapala et al.

(10) Patent No.: US 7,466,233 B2
(45) Date of Patent: Dec. 16, 2008

(54) SUBSTRATES INCLUDING TAPE AND RADIO FREQUENCY IDENTIFICATION DEVICES, AND METHODS AND APPARATUS FOR MAKING THE SAME

(75) Inventors: Wieslaw A. Drapala, Vancouver, WA (US); Matthew E. Groves, Vancouver, WA (US); Jorge A. Nash, Vancouver, WA (US); Joseph P. Renzetti, Vancouver, WA (US)

(73) Assignee: Adalis Corporation, Vancouver, WA (US)

( * ) Notice: Subject to any disclaimer, the term of this patent is extended or adjusted under 35 U.S.C. 154(b) by 174 days.

(21) Appl. No.: 11/123,240

(22) Filed: May 4, 2005

(65) Prior Publication Data

US 2006/0250242 A1 Nov. 9, 2006

(51) Int. Cl.
*G08B 13/14* (2006.01)
(52) U.S. Cl. .................................................. 340/572.1
(58) Field of Classification Search ... 340/572.1–572.9; 428/34.2, 174
See application file for complete search history.

(56) References Cited

U.S. PATENT DOCUMENTS

| | | | | |
|---|---|---|---|---|
| 4,567,070 | A | | 1/1986 | Karass .......................... 428/35 |
| 4,773,541 | A | | 9/1988 | Riddell ........................ 206/606 |
| 5,098,757 | A | | 3/1992 | Steel .......................... 428/34.2 |
| 5,135,790 | A | | 8/1992 | Kaplan et al. .................. 428/77 |
| 5,478,639 | A | * | 12/1995 | Kawaguchi et al. .......... 442/212 |
| 6,100,804 | A | | 8/2000 | Brady et al. ............... 340/572.7 |
| 6,478,229 | B1 | * | 11/2002 | Epstein ........................ 235/492 |
| 6,667,092 | B1 | | 12/2003 | Brollier et al. ............... 428/182 |
| 6,724,308 | B2 | | 4/2004 | Nicholson ................ 340/572.1 |
| 2002/0071937 | A1 | * | 6/2002 | Smith et al. .................. 428/182 |
| 2003/0107486 | A1 | * | 6/2003 | Okamoto et al. .......... 340/572.7 |
| 2003/0189490 | A1 | * | 10/2003 | Hogerton et al. .......... 340/572.8 |
| 2004/0124235 | A1 | | 7/2004 | White et al. ............ 229/125.34 |
| 2005/0022470 | A1 | | 2/2005 | Focke et al. .................... 53/415 |

FOREIGN PATENT DOCUMENTS

| | | |
|---|---|---|
| WO | WO 00/46122 | 8/2000 |
| WO | WO 03/084817 | 10/2003 |

(Continued)

OTHER PUBLICATIONS

International Search Report and Written Opinion for PCT/US2006/01681, European Patent Office, 10 pages, dated Dec. 7, 2006.

(Continued)

*Primary Examiner*—Phung Nguyen
(74) *Attorney, Agent, or Firm*—Klarquist Sparkman, LLP

(57) ABSTRACT

Reinforced constructs (e.g., non-corrugated or corrugated paperboard container blanks) that include a reinforcing tape wherein the reinforcing tape comprises at least one RFID device attached thereto. A first method for making such constructs includes applying reinforcing tape with the attached RFID device to at least a portion of at least one first paper layer, and pairing a second paper layer with the first paper layer such that the reinforcing tape and the at least one RFID device are positioned between the first and second paper layers to form the construct. In another method for making such constructs, particularly container blanks, a paper board substrate is transported on a container blank production line and a hot melt adhesive-coated reinforcing tape is applied to the paper board substrate.

35 Claims, 11 Drawing Sheets

FOREIGN PATENT DOCUMENTS

WO     WO 2004/041695     5/2004

OTHER PUBLICATIONS

PCT/US2006/016811 Partial International Search Report.
Web content from http://www.managingautomation.com/maonline/directory/product.jspx;jsessionid=AD9740 . . . , accessed on Mar. 7, 2005 pp. 1-2.
Web content from http://www.rfidproductnews.com/issues/2004.11/newprod/labels.php, accessed on Mar. 7, 2005 pp. 1-2.
Web content from http://www.packexpo.com/ve/38161/main.html, accessed on Mar. 7, 2005 p. 1.
Web content from http://www.elogmag.com/magazine/10/10-feature8.shtml, access on Mar. 7, 2005 pp. 1-2.
Web content from http://www.adhesivesmag.com/CDA/ArticleInformation/coverstory/BNPCoverStoryItem/O, . . . accessed on Mar. 7, 2005 pp. 1-4.
Web content from http://www.marotech.com/english/TapeSolutions.html, accessed on Mar. 8, 2005 pp. 2-3.
Adalis pamphlet "Innovative Reinforcement Systems for Corrugated Packaging", 2002.
Adalis pamphlet "Adalis Open-Sesame System Our Premier Opening System for Corrugated Packaging", 2002.
H.B. Fuller Company pamphlet "Sesame Tape and String-King Reinforcement for Containers" 1989.
Office Action in U.S. Appl. No. 11/122,977 dated Jun. 5, 2007.
Office Action in U.S. Appl. No. 11/122,977 dated Feb. 5, 2008.

\* cited by examiner

SUBSTRATES INCLUDING TAPE AND RADIO FREQUENCY IDENTIFICATION DEVICES, AND METHODS AND APPARATUS FOR MAKING THE SAME

FIELD

The present application is directed to substrates that include reinforcing tape with radio frequency identification (RFID) devices, and to methods and apparatus for making such substrates.

BACKGROUND

Systems that apply pressure sensitive RFID tags or labels to the outside of containers, or cartons, by applying pressure to the labels are known. Generally, these RFID tags are applied to the containers at the product manufacturer's site just prior to or after filling the container with product. The RFID tags typically are applied to pressure sensitive adhesive (PSA)-coated labels that are then applied to the containers. The speed with which the label printer can print labels and apply RFID tags is relatively slow at the product manufacturer's production line (e.g., at 15-30 meters/minute) and are typically applied by hand or "blown" onto the containers. Accordingly, the process for packing and labeling with RFID tags by a product manufacturer can be slow.

Pressure sensitive RFID tags commonly used in the art can become detached from the container because the pressure sensitive adhesive securing the tag to the container may not be suitable for the environment that the container will be subjected to during shipping and handling. Additionally, RFID tags applied to the outside of containers can be more susceptible to damage caused by impact with other objects, tampering, and environmental factors such as corrosive conditions. Implementing RFID technology onto containers to manage or track the contents of the container increases the overall cost of the containers.

Product manufacturers, as well as manufacturers of containers, desire improved container performance, generally in the form of stackability and/or reinforcement of critical stress points, for example, the hand holes, access holes, handles and scorelines. Typical methods of improving container performance have several drawbacks. For example, container designers may increase the weight or thickness of the container to improve stackability and provide bulge resistance. But improvements of this type tend to significantly increase the cost of producing and thus purchasing the containers. Other examples to improve container performance include applying tape and/or strapping to the outside of the box during a post-manufacturing step. This method may provide some reinforcement, but is often aesthetically unappealing and requires significant labor to apply the tape and/or strapping, which can be costly and overly burdensome.

Because of the slow speed of applying PSA labels with RFID tags to containers, there is a need for decreasing the time required for applying RFID tags onto containers and protecting the RFID tags from detaching from the containers and from damage. Furthermore, there is a need for implementing RFID technology into containers that improve container performance without significantly increasing the costs for producing and providing the RFID-ready containers.

SUMMARY

Disclosed below are representative embodiments that are not intended to be limiting in any way. The disclosed features and aspects of the embodiments can be used alone or in various novel and nonobvious combinations and sub-combinations with one another.

Disclosed herein is a reinforced construct that includes a non-corrugated paper board or corrugated paper board substrate comprising at least a first layer and at least a second layer; and a reinforcing tape secured to at least the first layer or the second layer such that the reinforcing tape is located between the first layer and the second layer, wherein the reinforcing tape comprises at least one RFID device attached thereto.

According to a further embodiment, there is disclosed a packaging container that includes at least one panel or flap, the panel or flap including an inside surface and an outside surface; and an adhesive-coated, reinforcing tape embedded within the panel or flap or secured to the inside of the panel or flap, wherein the reinforcing tape includes an RFID tag attached to a first major surface of the reinforcing tape.

Also disclosed is a method of making a reinforced construct that includes applying reinforcing tape to at least a portion of at least one first paper layer, wherein the reinforcing tape comprises at least one RFID device attached thereto; and pairing a second paper layer with the first paper layer such that the reinforcing tape and the at least one RFID device are positioned between the first and second paper layers to form a reinforced construct.

In an additional method disclosed herein, a paper board substrate (e.g., a corrugated paperboard or a folding carton board) is transported on a container blank production line, the paper board substrate having a first major surface and a second major surface opposing the first major surface. A hot melt adhesive-coated reinforcing tape is applied to at least one of the first major surface or the second major surface of the paper board substrate as it is transported on the production line, wherein the reinforcing tape comprises at least one RFID device attached thereto, such that the paper board substrate is formed into a plurality of container blanks, each of which container blanks includes at least one RFID device.

According to another aspect, there is disclosed a container blank that includes a container blank substrate having a first major surface and a second major surface opposing the first major surface and a hot melt adhesive-coated reinforcing tape secured to at least one of the first major surface or the second major surface, wherein the reinforcing tape comprises at least one RFID device attached thereto.

In a further embodiment, there is disclosed an apparatus for applying reinforcing tape to a substrate that includes:
a feeder configured to feed or guide reinforcing tape having a plurality of RFID devices attached to the reinforcing tape;
a homing system configured to selectively position the tape in a home position; and
an applicator configured to receive the tape from the feeder, the applicator further configured to introduce the tape to the substrate.

In another embodiment, there is disclosed a method for simultaneously reinforcing a stress point in a container and making the container RFID-ready, the method comprising applying a hot melt adhesive-coated reinforcing tape to at least one stress point of the container, wherein the reinforcing tape includes a RFID tag secured to at least one external surface of the reinforcing tape.

Also disclosed herein is an adhesive tape (which may or may not be a reinforcing tape) that includes an integrated circuit chip for use in RFID, a connector that is coupled to the RFID integrated circuit chip, and at least one conductive element coupled to the connector, wherein the conductive element is at least one of (i) a conductive filament attached or embedded in the tape or (ii) a conductive hot melt that includes a plurality of conductive particles.

The foregoing disclosure will become more apparent from the following detailed description, which proceeds with reference to the accompanying figures.

DETAILED DESCRIPTION

Figure 1:
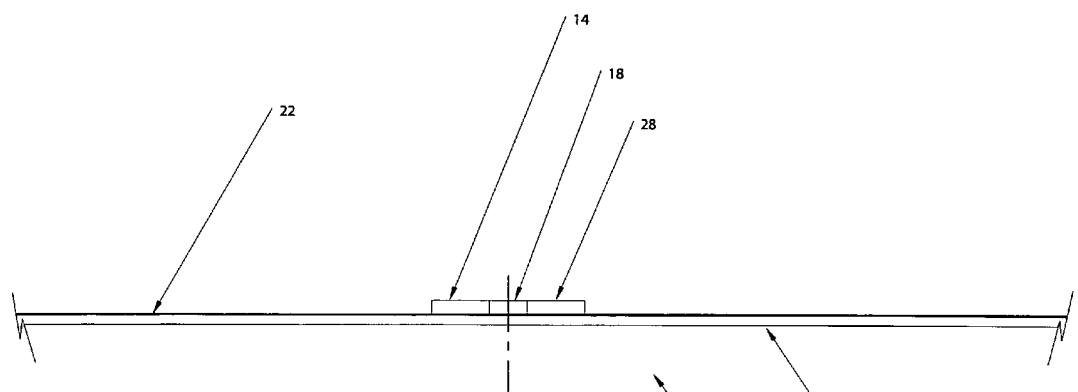
FIG. 1 is a side elevational view of a length of reinforcing tape with RFID including conductive filaments.
Figure 2:
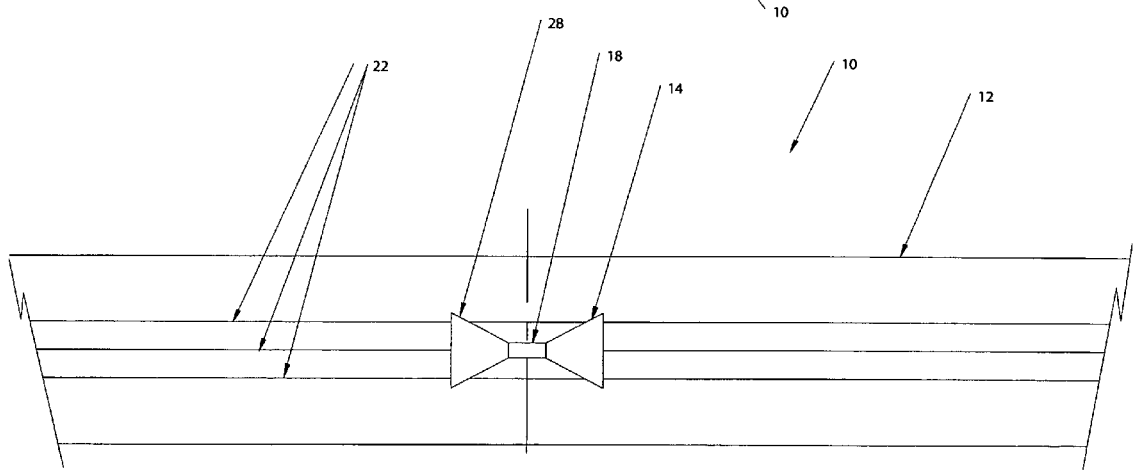
FIG. 2 is a top view of the length of reinforcing tape with RFID of FIG. 1.
Figure 3:
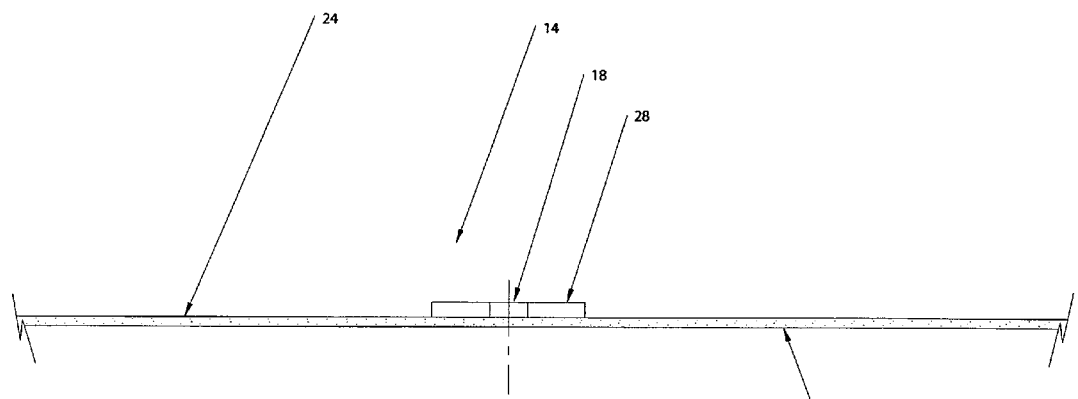
FIG. 3 is a side elevational view of a length of reinforcing tape with RFID including conductive hot melt.
Figure 4:
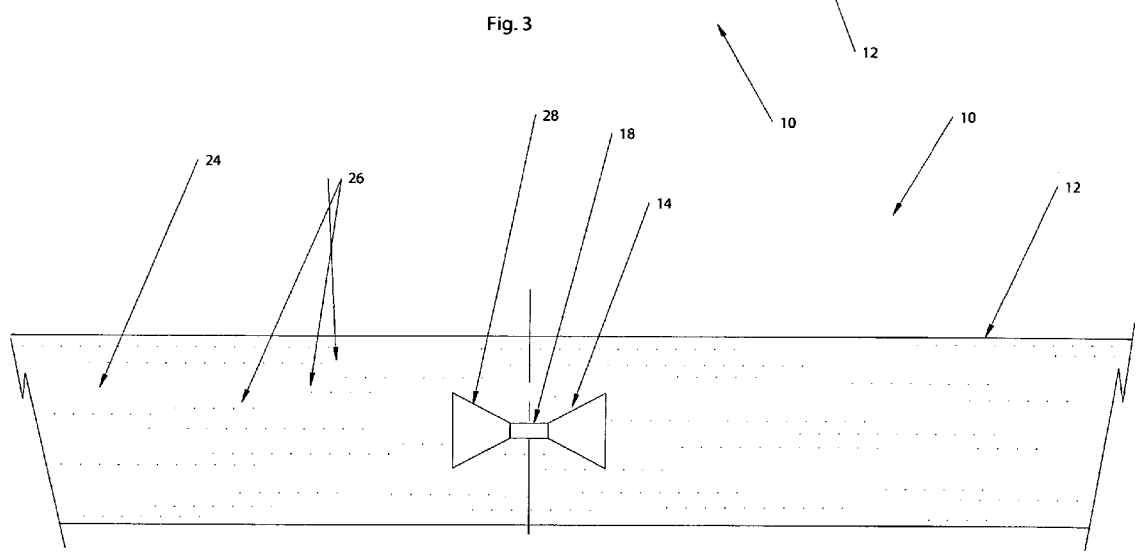
FIG. 4 is a top view of the length of reinforcing tape with RFID of FIG. 3.

Described below are embodiments of a tape and radio frequency identification (RFID) tag, and a method and apparatus for applying tape with RFID tags to a substrate. Generally, the tape with RFID tags can be applied to a substrate of a container, or box, during its manufacturing to increase the speed at which RFID tags can be applied to the container. The tape can be a reinforcing tape or a reinforcing opening system tape applied on or within the substrate to increase container performance while minimizing costs typically associated with increasing container performance. Likewise, in some embodiments, the reinforcing tape with an RFID tag is also located within the container substrate, which can assist in reducing the likelihood of detachment of the RFID tags from the container and damage of the RFID tags from impact with other objects. Accordingly, the application of reinforcing tape and an RFID tag within a container substrate can provide the advantages of RFID tag protection and RFID tracking and managing technology in a high performance container while minimizing container manufacturing costs.

More specifically, RFID tags typically are applied to containers or cartons after the containers or cartons have been formed or folded and glued into a finished container or carton (i.e., a post-manufacturing step). According to the methods described below, this extra post-manufacturing step is eliminated since the container or carton is made RFID-capable during the manufacturing of the container or carton.

Additionally, reinforcing tape improves the container or carton performance while lowering the container or carton cost. RFID technology is used to manage and control or track the contents in the container or carton (e.g., inventory and logistics) but increases the container or carton cost. Reinforcing tape with RFID technology on it improves container or carton performance and adds RFID capability, all in one step. For example, reinforcing tape may lower liner and/or corrugated board weight (which lowers cost), lower the cost of the corrugated member arrangement, and/or decrease the overall incident rate of container or carton failure. The lower board weight offsets the cost of adding RFID technology to the container or carton. In the methods and apparatus described below, RFID technology and reinforcement technology are combined into one to gain the synergistic benefits of improved container design with RFID capabilities at a reduced cost.

A. RFID Devices

An RFID device, or RFID tag, as used herein, refers generally to any device capable of receiving, storing and transmitting information through the use of radio waves. More specifically, an RFID tag can include an integrated circuit chip, circuitry, a memory component and an antenna mounted on a supporting substrate, typically made of a flexible organic material. An RFID device 14 is shown having an integrated circuit chip 18 (see FIGS. 1-5) and an antenna 20 (see FIG. 5). RFID devices can be either an active type or a passive type. Active type RFID devices include an on-board battery for powering the device and continuously or periodically transmitting signals. Passive type RFID devices derive their power principally from an RF signal received from an interrogating device for communicating with the RFID device and only transmit signals upon receiving an interrogation signal. The RFID device should be sufficiently flexible and heat resistant to undergo the substrate processing conditions described below in more detail.

B. Substrates with Tape

According to one embodiment, as illustrated in FIG. 1, reinforcing tape having a at least one RFID device attached thereto, hereinafter known as reinforcing tape with RFID, is indicated generally at 10. The reinforcing tape with RFID 10 is comprised of a reinforcing tape 12 and at least one RFID device 14.

Any type of reinforcing tape may be used. A reinforcing tape typically is applied to a substrate to reinforce stress points in the end product (e.g., a formed or finished carton or box) produced or formed from the substrate. In this context, a reinforcing tape differs from a package sealing tape that is used only to seal the opening, panels or flaps of a container or box. Container stress points that are typically reinforced are those that have weak points or areas subject to stress that occurs in container handling or filling. Examples of specific stress points include hand holes, access holes, handles, basiloid lifting areas, scorelines (e.g., corner or horizontal scorelines), and similar areas that are subject to tears or structural failure (which may lead to container stack collapse). Moreover, reinforcing tape may be added during the board manufacturing process as described below in more detail.

Reinforcing tape 12 can be made of a web material, film material, or fibrous material (or any combination thereof)

coated (e.g., impregnated) with at least one adhesive. For instance, certain examples of reinforcing tape may be a tape that includes multiple continuous strands of high tensile strength filaments, coated and impregnated with hot melt adhesive. The web material, film material, or fibrous material can be any material that is characterized by sufficient strength and elongation properties suitable for providing the desired degree of reinforcement. Examples of such materials include polyester fiber, polyester film, polyamide fiber (e.g., aromatic polyamide such as KEVLAR fiber from E.I. du Pont or non-aromatic polyamide such as nylon), polypropylene fiber, fiberglass and/or other similar materials. Reinforcing tapes are commercially available, such as, for example, those sold under the Sesame brand by Adalis Corporation, An H.B. Fuller Company, of Vancouver, Wash. In some implementations, reinforcing tape can have a tensile strength between about 1 and 136 kgf, more particularly at least about 8.2 kgf, most particularly of at least about 16 kgf, and especially particularly of at least about 27 kgf.

Generally, the adhesive of the reinforcing tape is configured to facilitate secure attachment of the tape to a container substrate. In some embodiments, the adhesive can be a hot melt adhesive (including, but not limited to, a hot melt pressure sensitive adhesive, a hot melt remoistenable adhesive, a water dispersible hot melt adhesive, a biodegradable hot melt adhesive or a repulpable hot melt adhesive), various heat activatable adhesives, various water activatable adhesives or various pressure sensitive adhesives. Examples of typical hot melt adhesives include an ethylene-vinyl acetate copolymer (EVA-based) hot melt adhesive; EMA-based hot melt adhesive (ethylene methylacrylate); EnBA-based hot melt adhesive (ethylene n-butyl acrylate); hot melt adhesive based on polyamides; hot melt remoistenable adhesive based on polyamides and copolyesters; hot melt adhesives based on polyethylene and polypropylene homopolymers, copolymers and interpolymers, rubbery block copolymer hot melt adhesives; or RF (radio frequency) activatable adhesives.

In some embodiments, reinforcing tape 12 can have a length longer than its width. In specific embodiments, the width is between about 3 mm and about 75 mm, more particularly about 6 mm to about 52 mm.

In some embodiments, the RFID device 14 is secured to the reinforcing tape 12 by positioning the RFID device on the tape and utilizing the adhesive that is present on a surface of the RFID device and/or the adhesive present in the reinforcing tape. For example, there are commercially available products that include a plurality of RFID tags positioned on a common flexible substrate or carrier (e.g., a release paper) that is wound into a roll or reel where each RFID tag includes a pressure sensitive adhesive applied to a surface of each RFID tag. The individual tags can then be removed from the flexible substrate and applied to the reinforcing tape at intervals along the length of the reinforcing tape by applying a pressure to the RFID tag 14. In another example, the RFID tags may be available on a wound roll or reel with a carrier. In this example, the RFID tags are simply separated and then applied to the reinforcing tape. The distance between the RFID devices 14 along the length of the tape generally remains the same and can be increased or decreased depending on the specific container application as will be described in more detail below. The reinforcing tape with RFID 10 can then be subsequently wound into a roll or a reel for future displacement to a container substrate.

In specific embodiments, the tape (which in these embodiments may or may not be reinforcing tape) with RFID may include one or more conductive elements extending beyond the length of the RFID tag for enhancing the reading and transmitting properties of the RFID device. In one embodiment, the conductive elements can include several strips of conductive filaments 22 extending the length of the tape 12 (see FIGS. 1 and 2). Conductive filaments 22 can be made from conductive materials, such as copper, silver, nickel, carbon, brass, aluminum, tin, and alloys, mixtures or combinations thereof. The strips of conductive filaments 22 can be applied to the tape 12 by any methods for applying filament to a tape.

In another embodiment, the conductive elements can include a conductive hot melt 24 made of a combination of hot melt glue and a plurality of conductive particles 26 made from conductive materials, such as copper, silver, nickel, brass, aluminum, tin and/or carbon particles (or alloys, mixtures or combinations thereof), and can range in size, for example, from microscopic to several millimeters. The conductive hot melt 24 can also extend the entire length of the tape 12 (see FIGS. 3 and 4). Conductive hot melt 24 can be applied to the tape by mixing the conductive particles 26 with the hot melt glue prior to forming the tape 12.

In some embodiments, the conductive elements can comprise a combination of conductive filaments 22 and conductive hot melt 24. Further, other conductive elements, such as aluminum and metallized fiber, can be applied along the length of the tape alone or in combination with the conductive filaments 22 and/or conductive hot melt 24.

The overall effect of the conductive elements is to increase the effectiveness of the RFID tag antenna 20, or as a substitute for the tag antenna (which eliminates the need for a separate tag antenna). In many applications, the size of the antenna 20 of the RFID tag 14 is limited, which in turn can limit the effectiveness of the RFID tag 14. By introducing conductive elements extending a significant portion of the length of the tape with RFID 10, the performance of the antenna 20 is increased compared to an antenna without conductive elements. For example, the distance from which an RFID device 14 can be read is increased and the reading rate of containers housing potentially signal-blocking content, such as fluids and metals, can be improved. Although in some embodiments, the conductive elements are in direct contact with the antenna, they need not be to realize the advantages of having conductive elements in the reinforcing tape. Accordingly, as shown in FIGS. 1-4, in some embodiments, an antenna may not be necessary since the conductive elements can provide adequate reception and readability without the antenna. In addition, the conductive elements could extend or wrap around the corner or edge of a container thus providing an additional geometrical plane by which the RFID device 14 could be accessed by radio waves.

In embodiments where the tape includes one or more conductive elements, the RFID device 14 can include a connector 28 attached to the tape 12 to facilitate electrical connectivity between the conductive elements and the RFID device 14. The connector 28 includes (i) an organic substrate to which the RFID device 14 can attach and (ii) electrical connections formed in the substrate configured to electrically couple the conductive elements with the RFID device 14.

Figure 5:
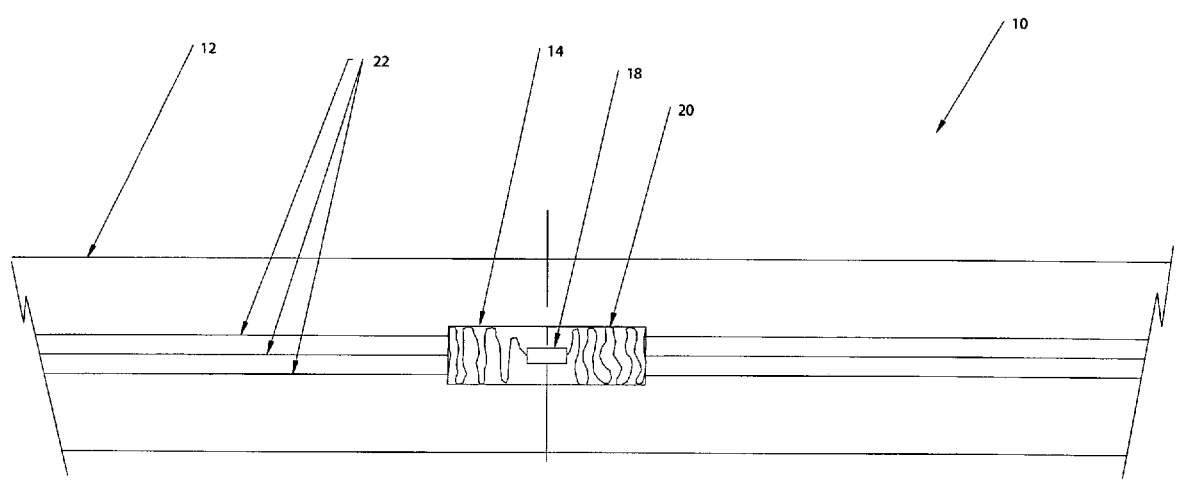
FIG. 5 is a top view of a length of reinforcing tape with RFID including conductive filaments and an antenna.

As indicated above, the conductive filaments 22 shown in FIG. 5 are optional. Thus, FIG. 5 (without the optional conductive filaments 22) depicts an example of a reinforcing tape 12 having a RFID device 14 attached to the reinforcing tape 12.

As described above, reinforcing tape with RFID 10 can be applied to a substrate to reinforce the substrate and facilitate tracking and managing of a container formed at least in part from the substrate. The substrate may a paper board or a corrugated substrate and may include, for example, films, non-woven or woven webs, paper products, non-corrugated paper board, folding carton blanks, box board, corrugated paper board and other sheet materials and web materials, all of various widths. One or more substrates can form an article of manufacture such as a packaging container in which contents to be tracked or managed are contained. Examples of packaging containers include cartons and boxes, such as cartons for holding beverages for sale at the retail level (for instance, a hand-carry carton that holds six, 12 or 24 bottles or cans of a beverage), meat and produce bulk bins, wet-packed containers, reusable containers, rubber and chemical bulk bins, and heavy duty containers. In beverage containers the reinforcing tape is typically located adjacent to the hand hole.

1. Continuous Substrate

Figure 6:
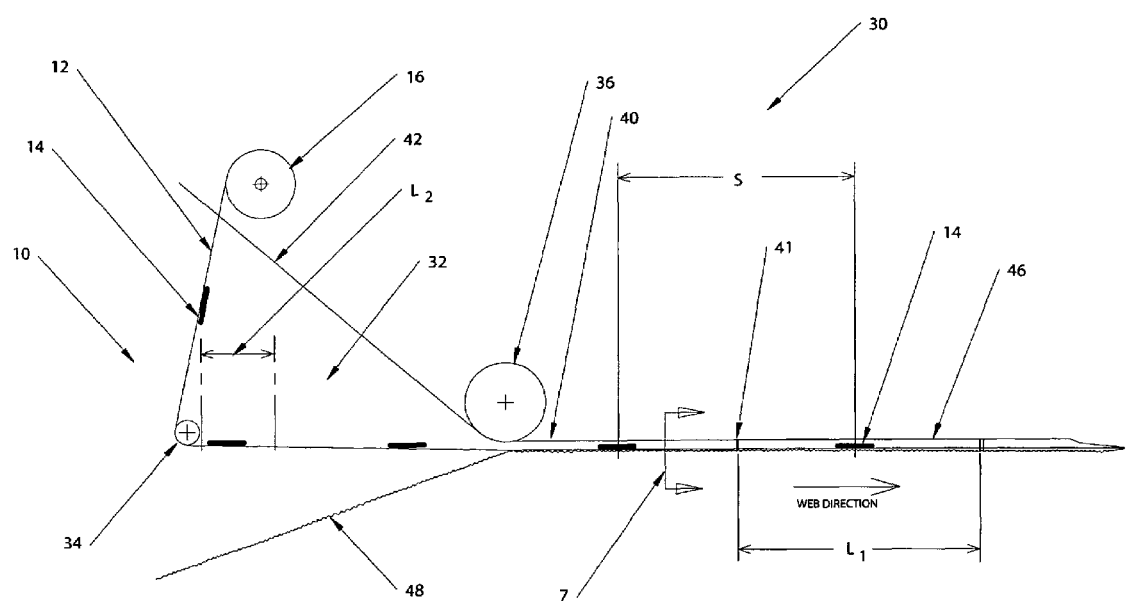
FIG. 6 is a diagrammatic fragmentary elevational view of an apparatus for applying reinforcing tape with RFID to a continuous substrate.
Figure 7:
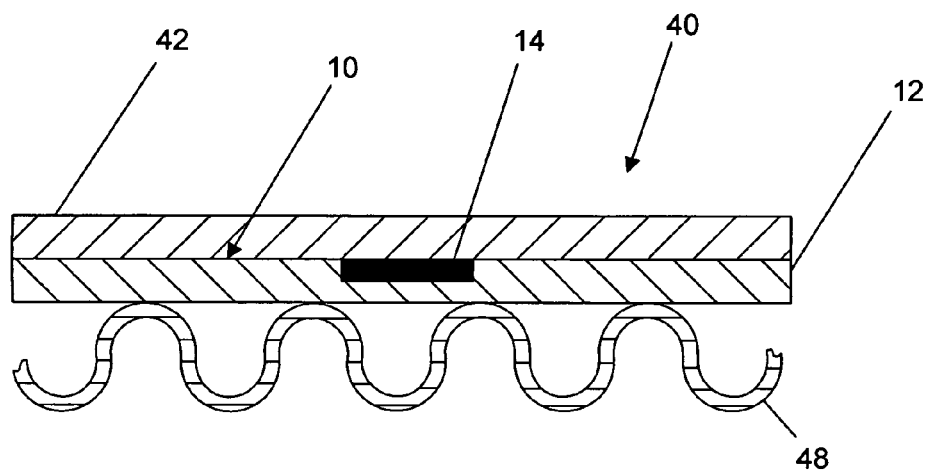
FIG. 7 is a side sectional view of a substrate with embedded reinforcing tape with RFID formed by the apparatus of FIG. 6.

In general, one embodiment of a continuous corrugated board substrate is shown in FIGS. 6 and 7. The continuous corrugated board substrate includes an exterior liner and a corrugated member. In some implementations, the corrugated member consists of a series of parallel flutes. However, in other implementations, the corrugated member can include other configurations, such as a waffle-type pattern or honeycomb.

The continuous corrugated board substrate can be manufactured by bonding the corrugated member to the exterior liner using an adhesive, such as a heat-activated adhesive, and subjecting the exterior liner and corrugated member to heat.

The substrate can be reinforced and tagged with an RFID device during its manufacture by continuously feeding reinforcing tape with RFID between the corrugated member and the exterior liner of the substrate prior to bonding the exterior liner to the corrugated member. The reinforcing tape with RFID includes an adhesive, such as a heat-activated adhesive, which is activated as the substrate is passed through the heat station to bond the reinforcing tape with the liner and/or the corrugated member. For example, the heat typically applied to a corrugator production line (e.g., via steam blowers) activates the hot melt adhesive and bonds the fibrous material of the reinforcing tape to the liner and/or corrugated member. In this way, a substrate can be formed having reinforcing tape with RFID embedded in the substrate, i.e., incorporation or insertion between layers of a substrate (e.g., between the substrate liner and the corrugated member).

The continuous corrugated board substrate with embedded reinforcing tape with RFID is then scored and cut into individual corrugated board blanks each having at least one embedded RFID device.

Although not shown, in some embodiments, the corrugated board substrate can also include an interior liner such that the corrugated member is at least partially positioned between the exterior liner and the interior liner. The interior liner could be applied to the corrugated member in a manner similar to that of the exterior liner as described above. Further, although FIGS. 6 and 7 show the reinforcing tape with RFID applied to the substrate such that it is positioned between the exterior liner and the corrugated member in FIGS. 6 and 7, it is recognized that with substrates having an interior liner, the reinforcing tape with RFID can be applied to the substrate such that it is positioned between the interior liner and the corrugated member.

Any apparatus or system may be used to apply the reinforcing tape with RFID to the corrugated board. A typical system is a Tape Dispenser Model V and Universal Beam tape applicator commercially available from Adalis Corporation, An H.B. Fuller Company, of Vancouver, Wash.

In one specific embodiment, as shown in FIG. 6, a system 30 for making a corrugated board substrate 40 having reinforcing tape with RFID 10 embedded within the substrate can include a mounted roll 16 of reinforcing tape with RFID 10. The reinforcing tape with RFID 10 includes a plurality of RFID devices 14 each spaced a distance S apart from each other along the length of the reinforcing tape 12 (the distance S typically is measured from the center line of each RFID device 14).

In one exemplary implementation, the reinforcing tape with RFID 10 is applied to the substrate 40 such that a single RFID device 14 is attached to each of the corrugated board blanks 46, which blanks 46 are formed by scoring and cutting the substrate 40 at cut locations 41. Since the reinforcing tape with RFID 10 is continuously fed into the substrate 40 as it is formed, the tape 12 extends the entire length of the substrate 40 and thus each corrugated board blank 46. Accordingly, the distance $L_1$ can be defined as the length of each corrugated board substrate blank 46, which is about equal to the length S between each RFID device 14. The length of the RFID device 14 is less than the length of the corrugated board blank, i.e., the distance $L_1$.

In other implementations where attaching more than one RFID device 14 to each corrugated board blank 46 may be desirable, the distance between each RFID device 14 on the reinforcing tape 12 may be less than the length of the corrugated board blank 46. In still other implementations, the RFID devices 14 on the reinforcing tape 12 may not be equally spaced apart.

The reinforcing tape with RFID 10 is unwound from the roll 16 as it is fed through a feed mechanism indicated generally at 32. The feed mechanism 32 can include a guide wheel 34 and a roller 36. The guide wheel 34 is configured to properly position the reinforcing tape with RFID 10 prior to being fed through the roller 36. The roller 36 is configured to receive and at least partially advance the reinforcing tape with RFID 10. The roller 36 is also configured to receive and advance various layers of the substrate. For example, as shown in FIG. 6, the roller 36 receives and advances exterior liner 42 and a corrugated layer 48 from a supply (not shown) such that the reinforcing tape with RFID 10 is positioned between the exterior liner and corrugated layer.

The exterior liner 42, reinforcing tape with RFID 10 and corrugated layer 48 are at least partially pressed together by the roller 36 and heat is applied to the combination of layers to bond the layers to each other to form the corrugated board substrate 40. The pressure applied by the roller is sufficient to achieve the desired bonding and may vary widely. The level of applied heat is sufficient to achieve the desired bonding and may vary widely. An illustrative range of applied heat is about 80 to about 120° C. The application of heat activates the adhesive of the reinforcing tape with RFID 10 to bond it to the exterior liner 42, corrugated layer 48 or both depending on the application of the adhesive and orientation of the reinforcing tape with RFID. Further, the exterior liner 42 and/or corrugated layer 48 can have a coating of heat-activated adhesive applied thereto prior to passing through the roller 36. The application of heat then activates the adhesive to bond the exterior liner 42 and/or corrugated layer 48 to the reinforcing tape with RFID 10. The bonded layers of the corrugated board substrate 40 of FIG. 6 are shown in more detail in FIG. 7.

As should be recognized, in applications where the corrugated board substrate 40 includes an interior liner, the roller receives and at least partially presses the interior liner along with the exterior liner 42, corrugated member 44 and reinforcing tape with RFID 10. A heat-activated adhesive can be applied to the interior liner and/or a surface of the corrugated member adjacent the interior liner to bond the interior liner to the corrugated member 44 by the application of heat as herein described.

In some implementations, the roller 36 is heatable and can apply a bonding heat to the combination of layers as they are at least partially pressed together by the roller to form substrate 40. In some implementations, the combination of layers is passed through a heating station (not shown) positioned downstream of the roller 36 and configured to apply heat sufficient to activate the adhesives and bond the layers together.

The system 30 includes a die-cut station (not shown) to cut and form the corrugated board substrate 40 into individual corrugated board blanks 46 each having a length $L_1$ as described above. The die-cut station includes a scoring device and a cutting device. The scoring device forms grooves in the substrate 40 for assisting in folding the blanks 46 into a container by the user or in a downstream operation. The cutting device can be any means for cutting through a substrate, such as a hydraulic cutting press. As the substrate 40 passes through the system 30, the cutting device cuts through the substrate at the predetermined length of the blank.

Figure 12:
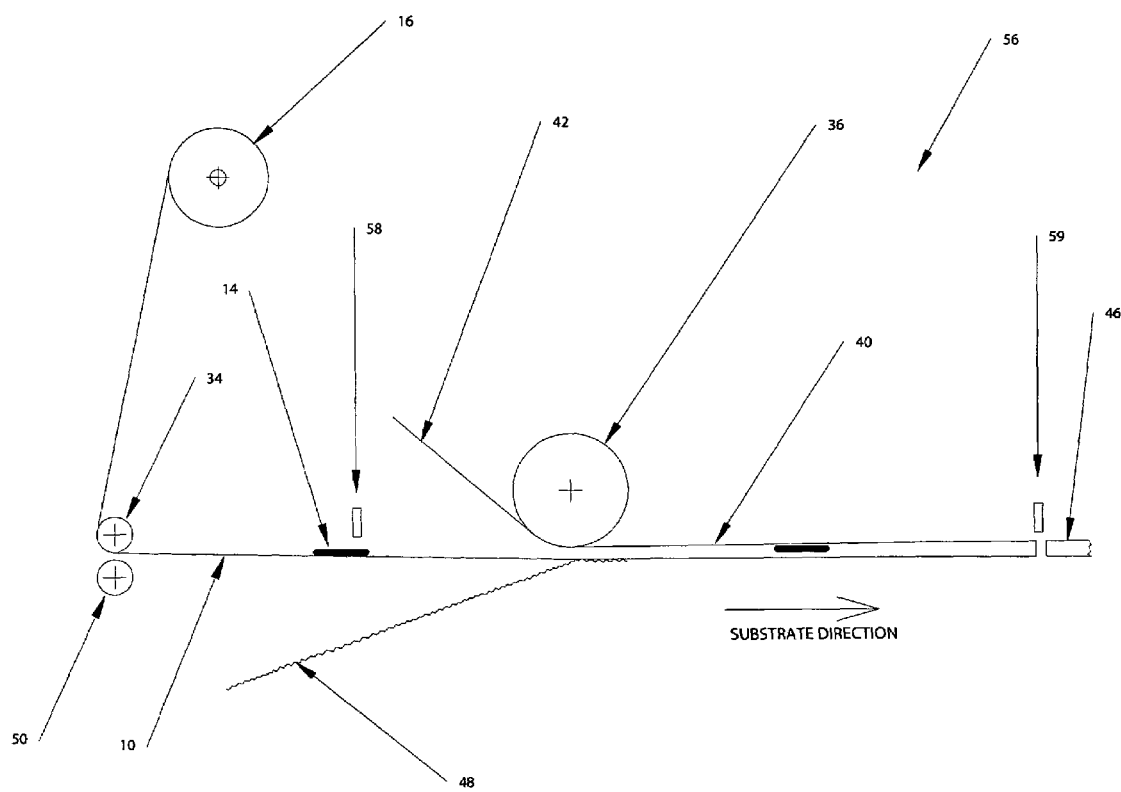
FIG. 12 is a diagrammatic fragmentary elevational view of the apparatus of FIG. 6 having a homing system.

The system 30 can include a homing system 56 to ensure that at least one RFID device 14 in its entirety is positioned at a desired location on or in each corrugated board blank 46. As shown in FIG. 12, the homing system 56 includes an RFID edge sensor 58 and a board blank cutting sensor 59, where the RFID edge sensor and the board blank cutting sensor are electronically coupled to each other. The RFID edge sensor 58 is positioned at a "home position" and configured to detect the presence of a leading edge of each RFID device 14 on the reinforcing tape with RFID 10.

Figure 13:
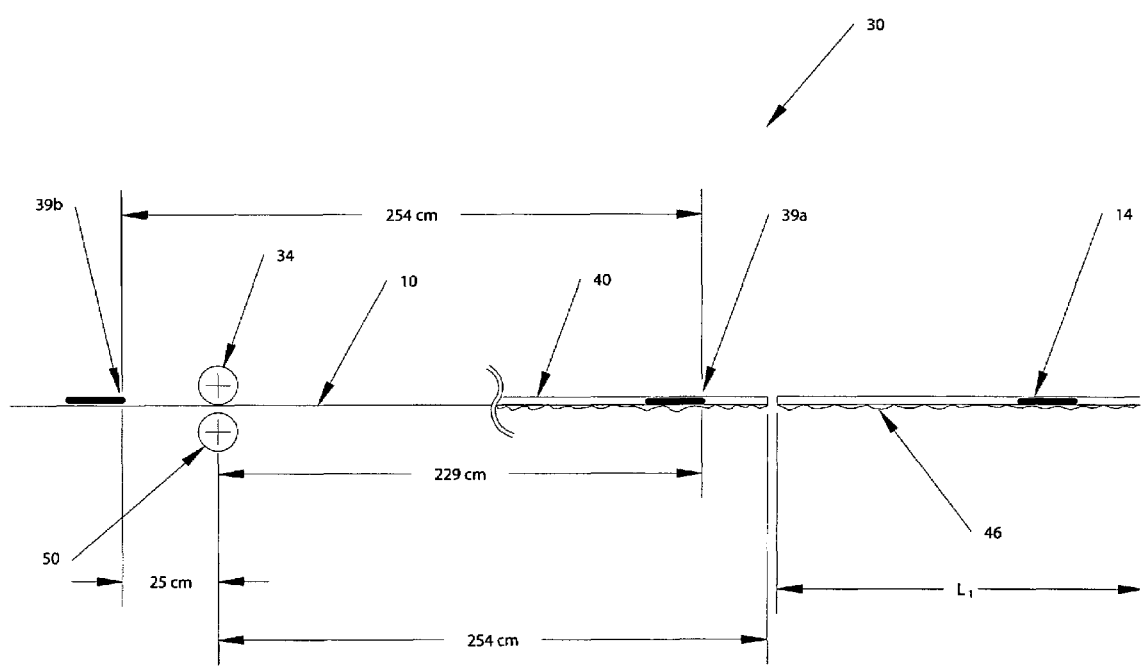
FIG. 13 is a diagrammatic fragmentation elevational view of the apparatus of FIG. 6 showing a "home position" for reinforcing tape with RFID according to one specific implementation.

The home position is a predetermined distance $L_2$ from a known reference point, such as the center of the guide wheel 34, and is based on the distance from the reference point to the cutting device, such that when the corrugated board substrate 40 is cut into an individual corrugated board blank 46, at least one RFID device 14 on the reinforcing tape 12 is positioned on the desired location on the blank (see FIG. 6). For example, in one specific implementation shown in FIG. 13, it may be desirable to position each RFID device 14 on a corrugated board blank 46 such that the leading edge of the device is 25 cm from a leading edge of the blank. In this embodiment, the home position of the system 30 can be a home position 39a that is 229 cm downstream of the guide wheel 34, or a home position 39b that is 25 cm upstream of the guide wheel, when the cutting device is positioned 254 cm away from the guide wheel 34 to cut corrugated board blanks 46 each having a length $L_1$ of 254 cm. Further, since the desired length $L_1$ of each corrugated board blank 46 is 254 cm inches, the distance between each RFID device 14 on the roll 16 of reinforcing tape 12 is also 254 cm.

Referring back to FIG. 12, detection of a leading edge, i.e., downstream edge or edge facing generally in the downstream direction, of an RFID device 14 by the RFID edge sensor 58 signals a pinch roll 50 positioned upstream of the roller 36 to close to prevent further advancement of the reinforcing tape with RFID 10. The blank cutting sensor 59 detects whether the blank has been cut by the cutting device. Once the cutting device cuts the substrate 40 into a blank 46, the blank cutting sensor 59 signals the pinch roll 50 to open to allow the reinforcing tape with RFID 10 to continue advancement through the roller 36 with the exterior liner 42 and corrugated layer 48.

Another way to control the tag position automatically is to place the tag sensor 58 downstream from the blank cutting sensor 59. A controller can calculate the tag position from these two sensor signals. Instead of using pinch roll 50 and roller 34 to prevent or allow tape advancement, a tensioning device could be deployed near roller 34 to control the RFID tag position. If the RFID tag position is too far downstream from the desired position, the tensioning device would decrease tape tension to allow the RFID tag position to move upstream. When the RFID tag position is too far upstream from the desired position, the tensioning device would increase the tape tension, stretching the tape, to allow the RFID tag position to move downstream.

In the above-described embodiment the system's cutting device can be used to cooperate with the RFID edge sensor through the board blank cutting sensor to signal the pinch roller to open. Other embodiments may include utilizing the substrate and/or blank score lines or some other reference point on the substrate and/or blank to cooperate with the RFID edge sensor to signal the pinch roller to open.

The reinforcing tape with RFID may be applied to the continuous corrugated board at any production line speed. For illustrative purposes, the reinforcing tape with RFID can be applied to the continuous corrugated board at production line speeds of 152-366 meters/minute, or at production line speeds of at least about 213 meters/minute.

The continuous substrate embodiment has been described above with reference to corrugated board, but the techniques described above could also be applied to any type of substrate wherein the reinforcing tape is applied to the substrate as a continuous strip (i.e., as opposed to non-continuous substrate wherein the reinforcing tape is cut into separate, discrete strips as it is applied in the production line as described below in more detail). For example, continuous folding carton could also be made RFID-ready.

2. Non-Continuous Substrate

Figure 9:
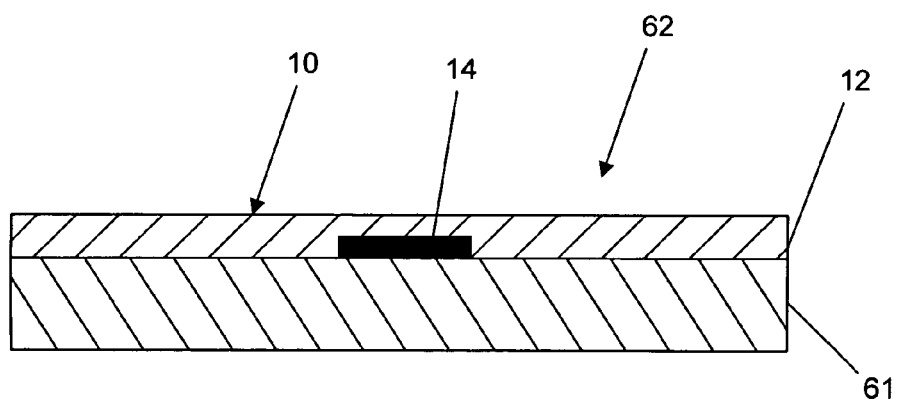
FIG. 9 is a side sectional view of a pre-cut substrate with attached reinforcing tape with RFID formed by the apparatus of FIG. 8.
Figure 8:
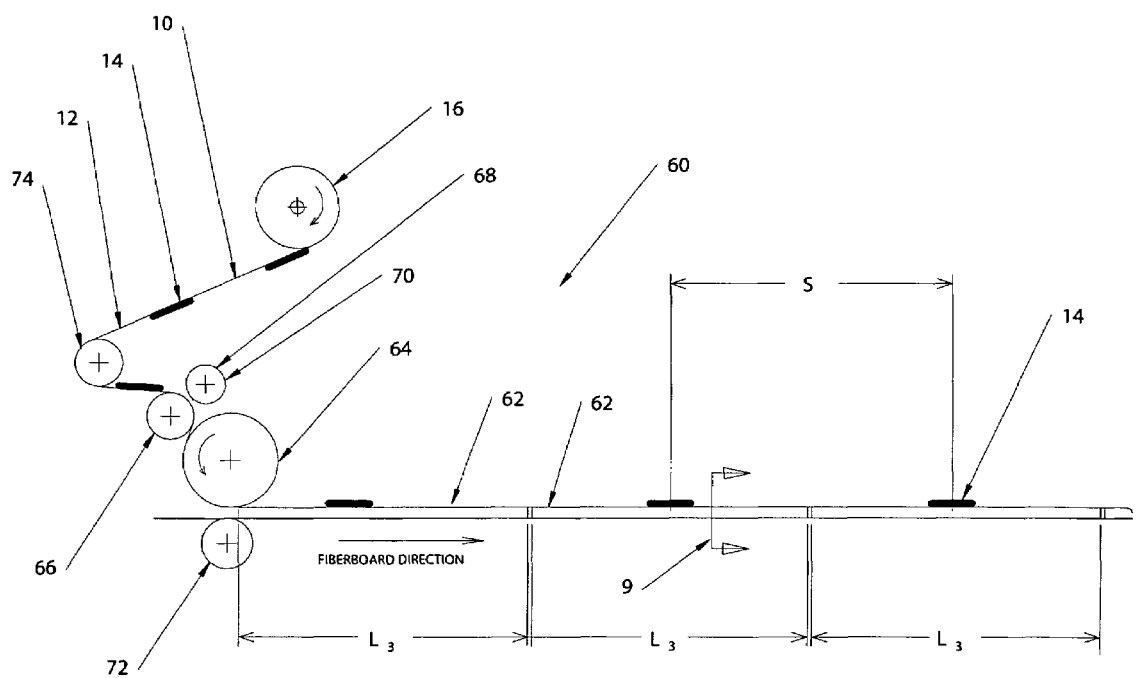
FIG. 8 is a diagrammatic fragmentary elevational view of an apparatus for applying reinforcing tape with RFID to a pre-cut substrate.

In general, one embodiment of a folding carton substrate is shown in FIGS. 8 and 9. Unlike the continuous corrugated board of FIGS. 6 and 7, the folding carton substrate is a pre-cut, pre-formed individual folding carton blank produced prior to application of reinforcing tape with RFID onto the substrate. The folding carton substrate can be any applicable substrate that can be used to form a container or carton. However, the application of tape with RFID on non-continuous substrate is not limited to folding carton, but can be applied to any type of non-continuous substrate such as non-continuous corrugated blanks.

The folding carton substrate, e.g., an individual folding carton blank, can be reinforced and tagged with an RFID device by cutting a length of reinforcing tape with RFID from a roll and applying the length onto a surface of the folding carton blank. The reinforcing tape with RFID includes an adhesive, such as a heat-activated adhesive or a pressure sensitive adhesive that bonds the reinforcing tape with RFID to the folding carton blank. The positioning of the length of reinforcing tape with RFID on the blank can be controlled by a homing device.

FIG. 9 depicts a side sectional view of a pre-cut carton blank 62 with a reinforcing tape 12 with RFID tag 14 that is adhered to a surface of a carton blank substrate 61. In the particular embodiment shown in FIG. 9, the RFID tag 14 is positioned adjacent to the surface of the carton blank substrate 61. However, in an alternative embodiment as shown in FIG. 6, the RFID tag 14 may be located on an opposing surface of the reinforcing tape 12 that faces away from the surface of the carton blank substrate 61.

Any apparatus or system may be used to apply the reinforcing tape with RFID to the folding carton substrate. For example, a typical system for applying tape to carton blanks is shown in US-2004-0112517-A1 (published Jun. 17, 2004), which is incorporated herein by reference. Examples of apparatus and systems are described below in more detail.

In one specific embodiment, as shown in FIG. 8, a system 60 for applying reinforcing tape with RFID 10 to individual folding carton blanks 62 can include a mounted roll 16 of reinforcing tape with RFID 10 as described above in relation to FIG. 6. In one exemplary implementation, the length of each strip of reinforcing tape with RFID 10 is equal to the length $L_3$ of carton blanks 62. Accordingly, the distance S between each RFID device 14 on the reinforcing tape 12 can approximately equal the length $L_3$. In another exemplary implementation, the length of each strip of reinforcing tape with RFID 10 is less than the length $L_3$ of carton blanks 62.

Although in this exemplary implementation the distance S between each RFID device 14 along the reinforcing tape 12 is the same, in some implementations, the distances need not be the same.

The reinforcing tape with RFID 10 is fed from the roll 16, onto a feed roll 74 and then onto an anvil vacuum roll 66 about which the reinforcing tape with RFID is carried onto the applicator wheel 64. A rotary knife roller 68, supported for rotation on an axis parallel to the axes of the anvil vacuum wheel 66 and the applicator wheel 64, cuts the reinforcing tape with RFID 10 to form individual strips having a desired length. The speeds of the anvil vacuum roll 66 and rotary knife roll 68 are changeable to change the length of the strips of reinforcing tape with RFID applied to the applicator wheel 64.

The rotary knife roll 68 includes at least one knife blade 70 placed on a peripheral surface of the roll. As the knife roll 68 rotates, the knife blade 70 interacts with the anvil vacuum wheel 66 to cut the reinforcing tape with RFID 10 into individual strips.

The applicator wheel 64 interacts with the anvil vacuum wheel 66 to urge the transfer of the strips of reinforcing tape with RFID 10 from the anvil vacuum wheel to the applicator wheel and retain the strips against the applicator wheel. The strips of reinforcing tape with RFID 10 are carried on the applicator wheel 64 until the strips are applied to a folding carton blank substrate 61 as the substrate 61 passes through a pinching area between the applicator wheel 64 and a pinch roll 72.

In some embodiments, the adhesive of the reinforcing tape with RFID 10 is a heat-activated adhesive and the applicator wheel 64 heats the tape as the tape is applied to the folding carton blanks 62 to bond the reinforcing tape with RFID 10 to the blanks. In some embodiments, the adhesive is a pressure sensitive adhesive and the applicator wheel 64 applies a pressure to the reinforcing tape with RFID 10 as the tape is applied to the folding carton blanks 62 to bond the tape to the blanks.

Figure 14:
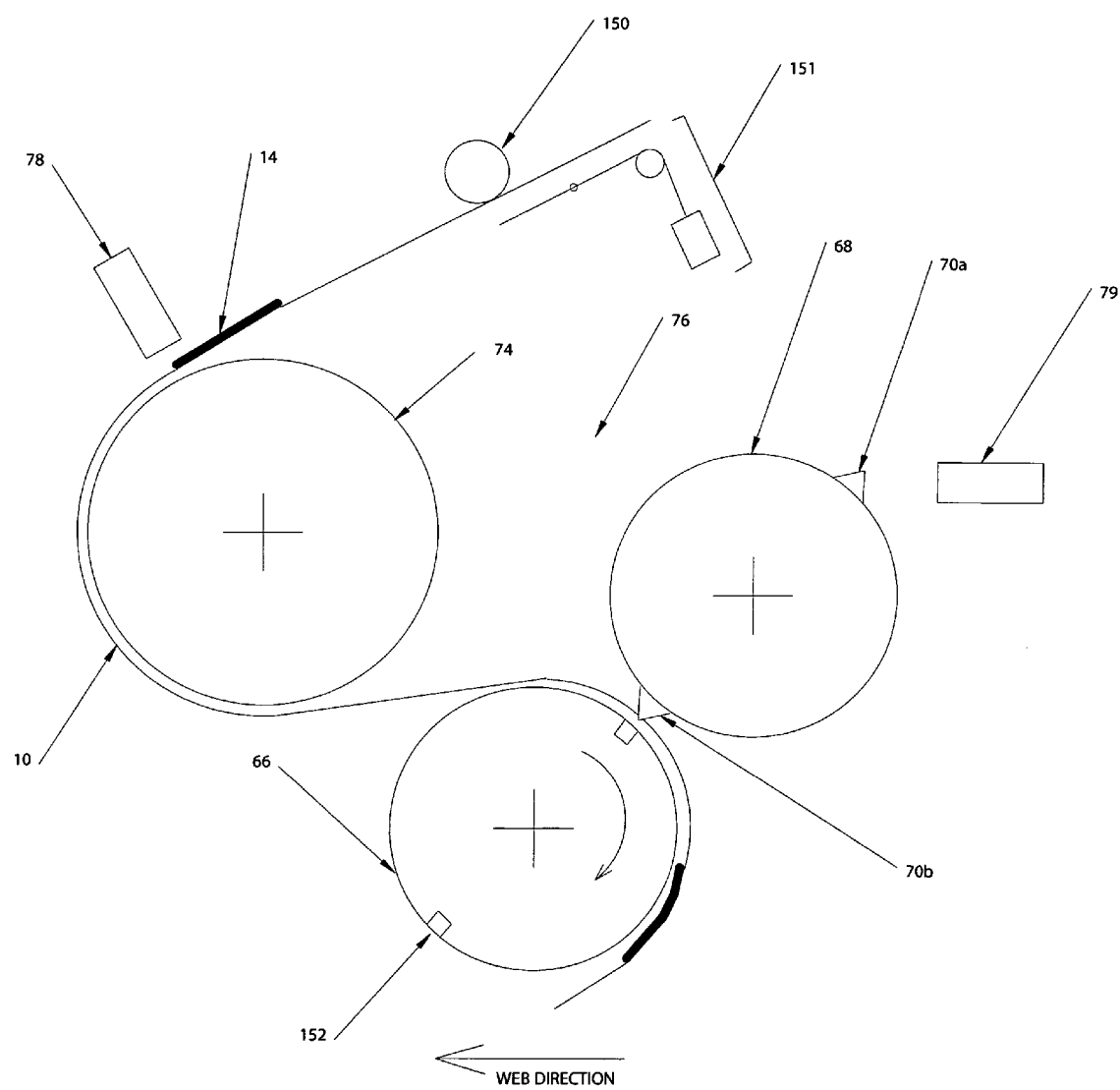
FIG. 14 is a diagrammatic fragmentary elevational view of the apparatus of FIG. 8 having a homing system.

As shown in FIG. 14, the system 60 can also include a homing system 76 that places or indexes the reinforcing tape with RFID to a "home position" on the anvil vacuum wheel 66. The home position is any position where each length of reinforcing tape with RFID, or strip, cut by the knife roll 68 contains an RFID device 14 in its entirety. In other words, the home position can be any position on the anvil vacuum wheel 66 where the RFID device 14 will not be cut by the knife roll 68. In general, the length of the RFID device 14 must be less than the circumferential distance between each knife blade 70 on the knife roll 68.

The homing system 76 can be manually or automatically set, and automatically controlled.

In one embodiment, the homing system 76 is manually set to position the reinforcing tape with RFID 10 in the home position by threading the reinforcing tape with RFID through the system and around the anvil vacuum wheel 66 such that the leading edge of RFID device 14 is downstream of a first knife blade, such as knife blade 70a, when the knife blade interacts with the anvil vacuum wheel and a trailing edge, i.e. upstream edge or edge facing generally in the upstream direction, of RFID device 14 is upstream of a second knife blade, such as knife blade 70b, when the second knife blade interacts with the anvil vacuum wheel. By manually setting the position of the reinforcing tape with RFID 10 in a home position, an RFID device 14 in its entirety will be positioned on a strip of reinforcing tape with RFID 10 upon startup of the system 60.

In one embodiment, the homing system 76 is automatically set to position the reinforcing tape with RFID 10 in the home position on startup. In this embodiment, the homing system 76 includes an RFID edge sensor 78 and a knife edge sensor 79, where the RFID edge sensor and the knife edge sensor are electronically coupled to each other. On startup of the system 60, the reinforcing tape with RFID 10 is fed by feed roll 74 until the leading edge of an RFID device 14 is detected by the RFID edge sensor 78, at which time the feed roll 74 stops feeding the reinforcing tape with RFID. The rotary knife roll 68 and anvil vacuum roll 66 synchronously rotate or continue to synchronously rotate to reposition the reinforcing tape with RFID 10 on the anvil vacuum roll until the knife edge sensor 79 detects that a knife blade, such as knife blade 70a, is in a predetermined position. With the knife blade 70a in the predetermined position, the reinforcing tape with RFID 10 is in the home position. Accordingly, the edge sensor 79 then provides feedback to the feed roll 74 to commence feeding the reinforcing tape with RFID 10 through the system to be cut into a strip by a knife blade, such as knife blade 70a, of the rotary knife roll 68, where the strip contains at least one RFID device 14 in its entirety.

Another approach to accomplish setting the home position in a system in which the feed roll, anvil vacuum roll, and knife roll synchronously rotate is to include a sub-system that cooperates with the reinforcing tape with RFID 10 and the knife edge sensor(s). On startup a tape pinch device 151 releases the tape 10 from a guide roll 150 to allow the feed roll 74, the vacuum anvil roll 66, and the knife roll 68 to advance the tape 10. When the leading edge of the RFID device 14 is detected the tape pinch device 151 pinches the tape 10 against the guide roll 150 which prevents the tape 10 to advance any further while the feed roll 74, the vacuum anvil roll 66, and the knife roll 68 continue to rotate (the tape 10 is slipping along the surface of the rolls). When the knife edge sensor 79 detects that a knife blade is in the predetermined position the reinforcement tape 10 is in the home position. Accordingly, the edge sensor 79 then provides feedback to tape pinch device 151 to release thereby allowing feeding of the tape 10 through the system to be cut into a strip by a knife blade, such as knife blade 70a, of the rotary knife roll 68, where the strip contains at least one RFID device 14 in its entirety.

Similar to automatically setting the position of the reinforcing tape with RFID 10 upon startup of the system 60, the homing system 76 can also be automatically controlled to provide continuous adjustment of the position of the reinforcing tape with RFID 10 on the anvil vacuum roll 66 during operation of the system 60 to ensure that the reinforcing tape with RFID is in the home position prior to being cut into a strip by the rotary knife roll 68. Continuous adjustment is achieved by detecting the leading edges of the RFID devices 14 are they are being fed through the system at least partially by the feed roll 74. If necessary, for each RFID device 14 detected, the feed roll 74 is stopped until a knife blade, such as knife blade 70a, is in the predetermined position, as detected by the knife edge sensor 79, to place the RFID device in the home position. The knife edge sensor 79 then triggers the feed roll 74 to commence rotating and the reinforcing tape with RFID 10 is subsequently cut into a strip by the rotary knife roll 68 such that each RFID device 14 is located on a strip.

Although homing system 76 can stop the feed roll 74 to place the reinforcing tape with RFID 10 in the home position, it is recognized that upon detection of the RFID device 14 by the RFID edge sensor 78, the knife blade, such as knife blade 70a may be in the predetermined position. Consequently, the reinforcing tape with RFID 10 is already positioned in the home position and does not need adjusting. Therefore, the feed roll 74 need not be stopped and can continue uninterrupted to advance the reinforcing tape with RFID through the system 60.

The system 60 can also include carton blank sensing equipment as shown, for example, in US-2004-0112517-A1 for sensing characteristics of a carton blank 62 on which a length of reinforcing tape with RFID 10 will be applied. For example, the carton blank sensing equipment can, among other things, detect the presence of a carton blank 62, register indicia on a carton blank and/or measure a predetermined length of a carton blank. In certain embodiments, the feed roll 74 will not initiate the tape application process unless the carton blank sensing equipment senses the presence of a carton blank 62, specific predetermined registry indicia on the carton blank and/or a predetermined length of the carton blank has passed through the apparatus. In this way, the timing of the cutting and application of the reinforcing tape with RFID 10 can be controlled such that the position of a strip of reinforcing tape with RFID 10 can be registered at a predetermined location on the substrate.

The reinforcing tape with RFID may be applied to the folding carton blanks at any production line speed. For illustrative purposes, the reinforcing tape with RFID can be applied to the folding carton blanks at production line speeds of between 300-1,200 feet/minute, or at production line speeds of 12,500 to 50,000 carton blanks/minute.

C. Substrates with Opening System Reinforcing Tape

Tape opening systems can also provide reinforcement of a container substrate while facilitating effective opening of the container. In tape opening systems, the reinforcement typically includes at least two reinforcement tapes—a reinforcing tear tape and reinforcing tear guide tape. Examples of tape opening systems are disclosed in U.S. Pat. Nos. 5,098,757, 5,135,790 and 4,773,541, all of which are incorporated herein by reference.

Figure 10:
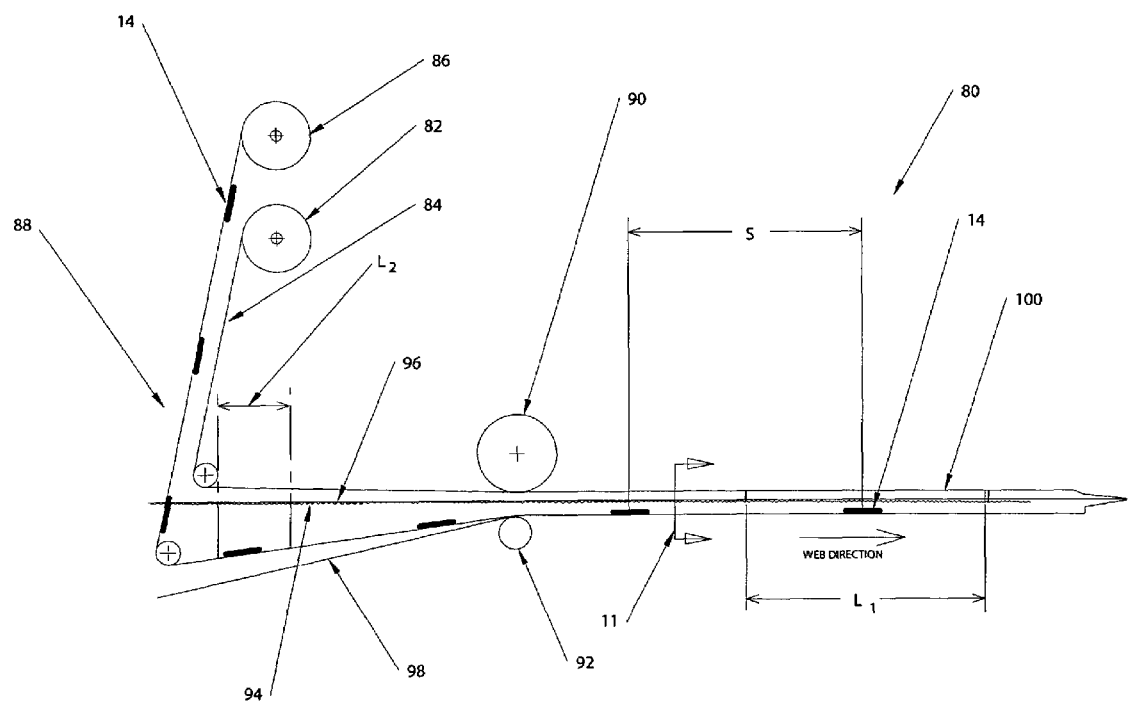
FIG. 10 is a diagrammatic fragmentary elevational view of an apparatus for applying reinforcing tape with RFID for an opening system to a continuous substrate.
Figure 11:
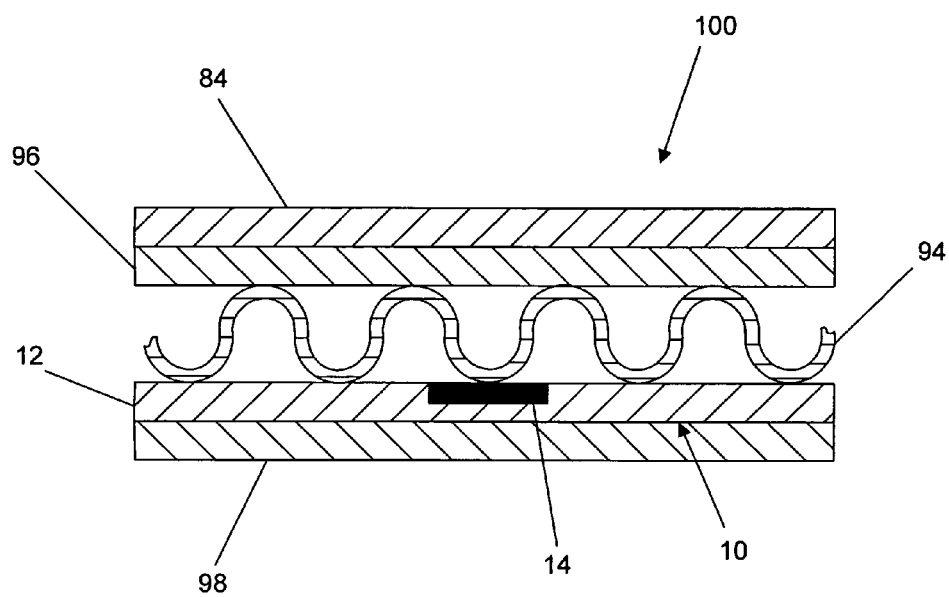
FIG. 11 is a side sectional view of a substrate with reinforcing tape with RFID for an opening system embedded therein formed by the apparatus of FIG. 10.

As shown in FIG. 10, tape opening system apparatus 80 can include a roll 82 of reinforcing tear tape 84 and a roll 86 of reinforcing tear guide tape 88. The reinforcing tear tape 84 and the reinforcing tear guide tape 88 each have at least one surface on which an adhesive is applied for securing the respective tape to a container substrate 100. Similar to the reinforcing tape with RFID 10, at least one RFID device 14 can be attached to the tear tape 84, tear guide tape 88, or both, in the same manner as RFID device 14 is attached to the reinforcing tape 12.

Tear tape 84 and tear guide tape 88 can be made from the same or similar materials and have the same or similar properties as reinforcing tape 12. Generally, tapes 84, 88 can be made from any material which has the ability to tear paper, such as hot melt coated tape or string or a pressure sensitive tape. Tear guide tape 88 generally has no weft or cross-machine direction strength and together with the machine direction strength of the guide tape permits the tearing thereof along a tear line between the tear tape 84 and the tear guide tape while also providing edge reinforcing therealong. The tapes 84, 88 can be sized to have the same or different widths between approximately 3 mm and 75 mm.

The tear tape 84 and/or tear guide tape 88, like the reinforcing tape with RFID 10 described above, can include one or more conductive elements extending beyond the length of the RFID tag. The conductive elements can include strips of conductive filaments or a conductive hot melt having a plurality of conductive particles suspended therein, which can be applied to the tapes 84, 88 in a manner similar to that described for the reinforcing tape with RFID 10.

As shown in FIG. 10, according to one embodiment, the roll 86 of tear tape guide 88 includes a plurality of RFID devices 14 equally spaced apart along the length of the tear guide tape. Although the illustrated embodiments show the RFID devices 14 attached to the tear guide tape 88, it is recognized that the RFID devices 14 could be attached to the tear tape 84 in addition to or instead of the RFID devices 14 on the tear guide tape 88.

In operation, the tear tape 84 and the tear guide tape 88 are unwound from their respective rolls as a forming wheel 90 rotates to draw the tapes between forming wheel and a pinch roll 92.

A corrugated member 94 of the substrate 100 to which the tape opening system is to be applied is also fed through the forming wheel 90 such that the corrugated member is positioned between the tear tape 84 and tear guide tape 88, where the tear guide tape is directly bonded to an adjacent surface of the corrugated member. In some embodiments, the corrugated member 94 can have an interior liner 96 pre-bonded to a surface of the corrugated surface opposite the surface adjacent to the tear guide tape 88. In other embodiments, the system includes a mounted roll of interior liner 96 separately fed through the forming wheel 90 contemporaneously with the corrugated member 94, an adhesive being applied to either the interior liner and or the corrugated member, to bond the interior liner to the corrugated member.

The system 80 can also include a mounted roll of exterior liner 98 to be fed through the forming wheel 90 contemporaneously with the tear tape 84, tear guide tape 88, interior liner 96 and corrugated member 94. The exterior liner 98 can be coated with an adhesive, such as a heat-activated or pressure-activated adhesive, to facilitate bonding to the corrugated member 94 of the substrate 100.

The forming wheel 90 applies pressure in embodiments where the adhesive used is a pressure-activated adhesive, or heat in embodiments where the adhesive used is a heat-activated adhesive, to bond the layers of the substrate 100 to each other.

When bonded to the substrate 100, the tear tape 84 and tear guide tape 88 are parallel to and juxtapose each other.

The system 80 can also include a homing system similar to the homing system 56 of system 30 to ensure that at least one RFID device 14 in its entirety is attached to and positioned at a desired location in or on the substrate 100.

In view of the many possible embodiments to which the principles of this disclosure may be applied, it should be recognized that the illustrated embodiments are only preferred examples and should not be taken as limiting the scope of the invention.

We claim:

1. A reinforced construct, comprising:
   a non-corrugated paper board or corrugated paper board substrate comprising at least a first layer and at least a second layer; and
   a reinforcing tape secured to at least the first layer or the second layer such that the reinforcing tape is located between the first layer and the second layer, wherein the reinforcing tape comprises at least one RFID device attached thereto and selectively positioned to provide adequate reception of and readability by radio waves.

2. The construct of claim 1, wherein the construct comprises a fiberboard or corrugated paperboard, and the substrate comprises an outer liner, an inner liner and at least one corrugated member positioned therebetween, and the reinforcing tape is secured to the corrugated member such that the reinforcing tape is located between the outer liner and the inner liner.

3. The construct of claim 2, wherein the reinforcing tape that includes the RFID device comprises a tear guide tape and the inner liner includes a first surface facing the corrugated member and a second surface opposing the first surface, and the construct further comprises a tear tape located on the second surface of the inner liner.

4. The construct of claim 2, wherein the corrugated member comprises a plurality of parallel flutes.

5. The construct of claim 1, wherein the construct comprises a blank for a packaging container.

6. The construct of claim 5, wherein the RFID device comprises an encoded RFID tag.

7. The construct of claim 1, wherein the RFID device comprises a RFID tag.

8. The construct of claim 1, wherein the RFID device comprises an integrated circuit chip, a connector coupled to the RFID integrated circuit chip, and at least one conductive element coupled to the connector, wherein the conductive element is at least one of (i) a conductive filament attached or embedded in the reinforcing tape or (ii) a conductive hot melt adhesive that includes a plurality of conductive particles.

9. The construct of claim 1, wherein the reinforcing tape comprises hot melt adhesive disposed on a fibrous material selected from polyester, polyamide, polypropylene, fiberglass, or a combination thereof.

10. The reinforced construct of claim 1, wherein the reinforcing tape has a tensile strength in the range of about 1 kgf and about 136 kgf.

11. The reinforced construct of claim 1, wherein the reinforcing tape comprises:
at least one of polyester fiber, polyester film, a polyamide fiber comprising an aromatic polyamide, a polyamide fiber comprising a non-aromatic polyamide, polypropylene fiber, fiberglass, or a combination thereof; and
a hot-melt adhesive.

12. The reinforced construct of claim 1, wherein the reinforced construct comprises a container blank.

13. The reinforced construct of claim 1, wherein the reinforcing tape has a tensile strength of at least about 8.2 kgf.

14. A packaging container comprising:
at least one panel or flap configured to at least partially form at least one wall of the packaging container, the panel or flap including an inside surface and an outside surface; and
an adhesive-coated, reinforcing tape embedded within the panel or flap or secured to the inside surface of the panel or flap, wherein the reinforcing tape includes an RFID tag attached to a first major surface of the reinforcing tape and selectively positioned to provide adequate reception of and readability by radio waves.

15. The packaging container of claim 14, wherein the reinforcing tape is located at a stress point of the container.

16. The packaging container of claim 14, wherein the reinforcing tape is embedded with the panel or flap.

17. A method of making a reinforced paper board construct, comprising:

applying reinforcing tape to at least a portion of at least a first paper layer, wherein the reinforcing tape comprises at least one RFID device attached thereto; and
pairing a second paper layer with the first paper layer such that the reinforcing tape and the at least one RFID device are positioned between the first and second paper layers to form a reinforced paper board construct, wherein the first paper layer and the second paper layer are transported on a container production line, and the reinforcing tape is applied to the first paper layer as it is transported on the container production line.

18. The method of claim 17, wherein the reinforced construct comprises at least one corrugated member, a first liner, and a second liner, the method comprising:
securing at least one corrugated member to the first liner;
applying the reinforcing tape to at least a portion of the corrugated member; and
securing the second liner to the corrugated member such that the corrugated member, the reinforcing tape, and the at least one RFID device are positioned between the first liner and the second liner.

19. The method of claim 17, wherein the reinforcing tape comprises hot melt adhesive disposed on a fibrous material selected from polyester, polypropylene polyamide, fiberglass, or a combination thereof.

20. The method of claim 17, wherein the reinforcing tape has a tensile strength in the range of about 1 kgf and about 136 kgf.

21. The method of claim 17, wherein the reinforcing tape comprises:
at least one of polyester fiber, polyester film, a polyamide fiber comprising an aromatic polyamide, a polyamide fiber comprising a non-aromatic polyamide, polypropylene fiber, fiberglass, or a combination thereof; and
a hot-melt adhesive.

22. The method of claim 17, wherein the reinforcing tape has a tensile strength of at least about 8.2 kgf.

23. A method for making a container blank, comprising:
transporting a paper board substrate on a container blank production line, the paper board substrate having a first major surface and a second major surface opposing the first major surface; and
applying a hot melt adhesive-coated reinforcing tape to at least one of the first major surface or the second major surface of the paper board substrate as it is transported on the container blank production line, wherein the reinforcing tape comprises at least one RFID device attached thereto, such that the paper board substrate is formed into a plurality of container blanks, each of which container blanks includes at least one RFID device.

24. The method of claim 23, wherein the paperboard substrate is cut into individual container blanks prior to application of the reinforcing tape.

25. The method of claim 23, wherein the paperboard substrate is cut into individual container blanks subsequent to application of the reinforcing tape.

26. An apparatus for applying reinforcing tape to a substrate, comprising:
a feeder configured to feed or guide reinforcing tape having a plurality of RFID devices attached to the reinforcing tape;
a homing system configured to selectively position the tape in a home position; and
an applicator configured to receive the tape from the feeder, the applicator further configured to introduce the tape to the substrate.

27. The apparatus of claim 26, wherein the applicator is configured to receive a paper liner and a corrugated layer such that the reinforcing tape is positioned between the paper liner and the corrugated layer.

28. The apparatus of claim 26, wherein the home position comprises a position of the tape such that upon introduction of the tape to the substrate the at least one RFID device is applied to the substrate at a location on or in the substrate.

29. The apparatus of claim 28, wherein the homing system comprises a first sensor configured to detect the presence of an RFID device and a second sensor configured to detect characteristics of the substrate, the first sensor and the second sensor being in electrical communication with each other to selectively control the rate at which the reinforcing tape is feed through the applicator.

30. The apparatus of claim 26, further comprising:
    a roller configured to receive and retain the reinforcing tape feed from the feeder; and
    a tape cutter configured to cut the reinforcing tape into strips while on the roller, each strip including at least one RFID device,
    wherein the applicator is configured to receive and retain the tape strips from the roller, the applicator further configured to dispense the tape strips onto the substrate.

31. The apparatus of claim 30, wherein the home position comprises a position of the tape on the roller such that at least one RFID device is on each of the cut tape strips.

32. The apparatus of claim 31, wherein the homing system comprises a first sensor configured to detect the presence of an RFID device and a second sensor configured to detect the presence of a knife blade attached to the tape cutter, the first sensor and the second sensor being in electrical communication with each other to selectively control motion of the feeder relative to the roller.

33. The apparatus of claim 26, wherein the reinforcing tape comprises a surface having a heat activated adhesive, and wherein the apparatus further comprises a heat applicator configured to apply heat to the tape for adhering the tape to the substrate.

34. A method of making a reinforced paper board construct, comprising:
    applying reinforcing tape to at least a portion of at least one first paper layer, wherein the reinforcing tape comprises at least one RFID device attached thereto;
    pairing a second paper layer with the first paper layer such that the reinforcing tape and the at least one RFID device are positioned between the first and second paper layers to form a reinforced paper board construct; and
    selectively positioning the reinforcing tape in a home position using a homing system prior to applying the reinforcing tape to at least a portion of the at least one first paper layer.

35. A method for making a container blank, comprising:
    transporting a paper board substrate on a container blank production line, the paper board substrate having a first major surface and a second major surface opposing the first major surface;
    applying a hot melt adhesive-coated reinforcing tape to at least one of the first major surface or the second major surface of the paper board substrate as it is transported on the container blank production line, wherein the reinforcing tape comprises at least one RFID device attached thereto, such that the paper board substrate is formed into a plurality of container blanks, each of which container blanks includes at least one RFID device; and
    selectively positioning the reinforcing tape in a home position using a homing system prior to applying the reinforcing tape to at least one of the first major surface or the second major surface of the paper board substrate.

* * * * *